(12) United States Patent
Eichhorn et al.

(10) Patent No.: US 7,549,524 B2
(45) Date of Patent: Jun. 23, 2009

(54) IDLER

(76) Inventors: Robert Eichhorn, 36 A, Second Ave, Houghton 2198 (ZA); Bogdan Bogdanovic, 19 Nightingale Crescent, Rand-en-Dal, 1739, Krugersdorp (ZA)

(*) Notice: Subject to any disclaimer, the term of this patent is extended or adjusted under 35 U.S.C. 154(b) by 343 days.

(21) Appl. No.: 10/588,020

(22) PCT Filed: Jan. 26, 2005

(86) PCT No.: PCT/IB2005/000182

§ 371 (c)(1),
(2), (4) Date: Aug. 1, 2006

(87) PCT Pub. No.: WO2005/080236

PCT Pub. Date: Sep. 1, 2005

(65) Prior Publication Data

US 2007/0062781 A1     Mar. 22, 2007

(30) Foreign Application Priority Data

Jan. 28, 2004   (ZA)   ................................. 2004/0678
Jan. 28, 2004   (ZA)   ................................. 2004/0679

(51) Int. Cl.
*B65G 13/00* (2006.01)

(52) U.S. Cl. ........................................................ 193/37
(58) Field of Classification Search ................. 198/780; 193/35 R, 37
See application file for complete search history.

(56) References Cited

U.S. PATENT DOCUMENTS

| | | | | |
|---|---|---|---|---|
| 3,550,231 A | * | 12/1970 | Dieter et al. | ................... 492/47 |
| 3,815,196 A | * | 6/1974 | Gotham et al. | ................. 193/37 |
| 3,847,260 A | * | 11/1974 | Fowler | ......................... 193/37 |
| 4,664,252 A | * | 5/1987 | Galbraith | ..................... 198/722 |
| 4,681,215 A | | 7/1987 | Martin | |
| 4,718,154 A | * | 1/1988 | Bauer et al. | ................... 193/37 |
| 5,036,766 A | * | 8/1991 | Songer | ......................... 101/375 |
| 6,209,702 B1 | * | 4/2001 | Agnoff | .......................... 193/37 |
| 2003/0183480 A1 | * | 10/2003 | Dyson et al. | .................. 193/37 |

* cited by examiner

*Primary Examiner*—James R Bidwell
(74) *Attorney, Agent, or Firm*—Ladas & Parry LLP

(57) ABSTRACT

The invention concerns an idler (10) having a shell (12) with at least one core (14) within the shell. The shell has at least one inwardly projecting shell formation (32), and the core has at least one outwardly projecting core formation (40), wherein the shell formation and the outwardly projecting core formation are engaged with one another.

19 Claims, 16 Drawing Sheets

IDLER

FIELD OF THE INVENTION

This invention relates to an idler and more particularly, but not exclusively to a conveyor idler.

SUMMARY OF THE INVENTION

According to the invention an idler having a shell with at least one core within the shell, the shell having at least one inwardly projecting shell formation, and the core having at least one outwardly projecting core formation, with the shell formation and the outwardly projecting core formation being engaged with one another.

The shell preferably has a plurality of spaced axially extending inwardly projecting shell formations, and the core has a plurality of spaced axially extending outwardly projecting core formations, with the shell formations being in interlocking engagement with the core formations.

The shell formations preferably project radially inwardly, and the outwardly projecting core formations project radially outwardly.

The shell formations and the outwardly projecting core formations may be in interlocking engagement with one another by way of an interference fit.

The shell formations preferably taper outwardly along their length from an outer end of the shell and inwardly along their height towards their free ends, and the outwardly projecting core formations preferably taper inwardly along their length from an outer end.

The shell formations may be ribs and the outwardly projecting core formations may be ribs.

The shell is preferably moulded from a polymeric material and the core is preferably also moulded from a polymeric material.

The core preferably includes a bearing receiving zone containing a bearing rotatably supporting the idler on a shaft.

The core may be an outer core containing at least one inner core, the inner core having at least one outwardly projecting inner core formation, and the outer core may have at least one inwardly projecting outer core formation, with the outwardly projecting inner core formation and the inwardly projecting outer core formation being in engagement with one another.

The idler preferably includes two cores within the shell, each core extending into the shell from an opposite end of the shell.

Each outer core may include an inner core.

In one form of the invention the shell consists of two sections connected together by a connector located intermediate the two cores.

According to another aspect of the invention an idler includes a shell with an outer surface and an inner surface, with a plurality of spaced axially extending inwardly projecting ribs.

According to another aspect of the invention a shell for an idler is injection moulded from a polymeric material and has an outer surface, with a plurality of spaced axially extending inwardly projecting ribs.

According to another aspect of the invention a core for an idler is injection moulded from a polymeric material and has an outer surface with a plurality of spaced axially extending outwardly projecting ribs.

The core preferably has a bearing receiving zone at one of its ends.

A bearing is preferably located in the bearing receiving zone. The bearing may be located in a housing which is preferably connected to a sealing arrangement so that the bearing housing and the sealing arrangement are a modular unit.

The sealing arrangement may include a shield, and the bearing housing is preferably rotatable relative to the shield. A labyrinth seal may be formed between the shield and the bearing housing. A centrifugal seal may be formed by a curved surface extending from the bearing housing.

The bearing housing may be connected to the shield by a connector. The connector may be a hollow spigot with a flange, with the spigot extending into the bore of the shield, and with the flange abutting the bearing housing or a bearing in the bearing housing.

The labyrinth seal is preferably formed by a first part located on the shield, and by a second part located on the bearing housing with the first and second parts overlapping one another to form the labyrinth seal.

The shield preferably has a projection which projects into the bore of the bearing housing, the projection having an abutting end for abutting a stationary surface axially to space the shield from the body.

According to another aspect of the invention a sealing arrangement includes a body rotatable relative to a shield, with the body containing a housing for a bearing, and wherein the arrangement including a labyrinth seal located between the shield and the body and/or a centrifugal seal formed by a curved surface on the exterior of the body.

According to another aspect of the invention a sealing arrangement includes a shield and a body, with the shield having a bore for a shaft and a projection with an abutting end surface for abutting a stationary surface axially to space the shield from the body and a connector for connecting the shield to the body so that in use the body can rotate relative to the shield, with the sealing arrangement including a labyrinth seal and/or a centrifugal seal.

DETAILED DESCRIPTION OF THE DRAWINGS

Figure 1:
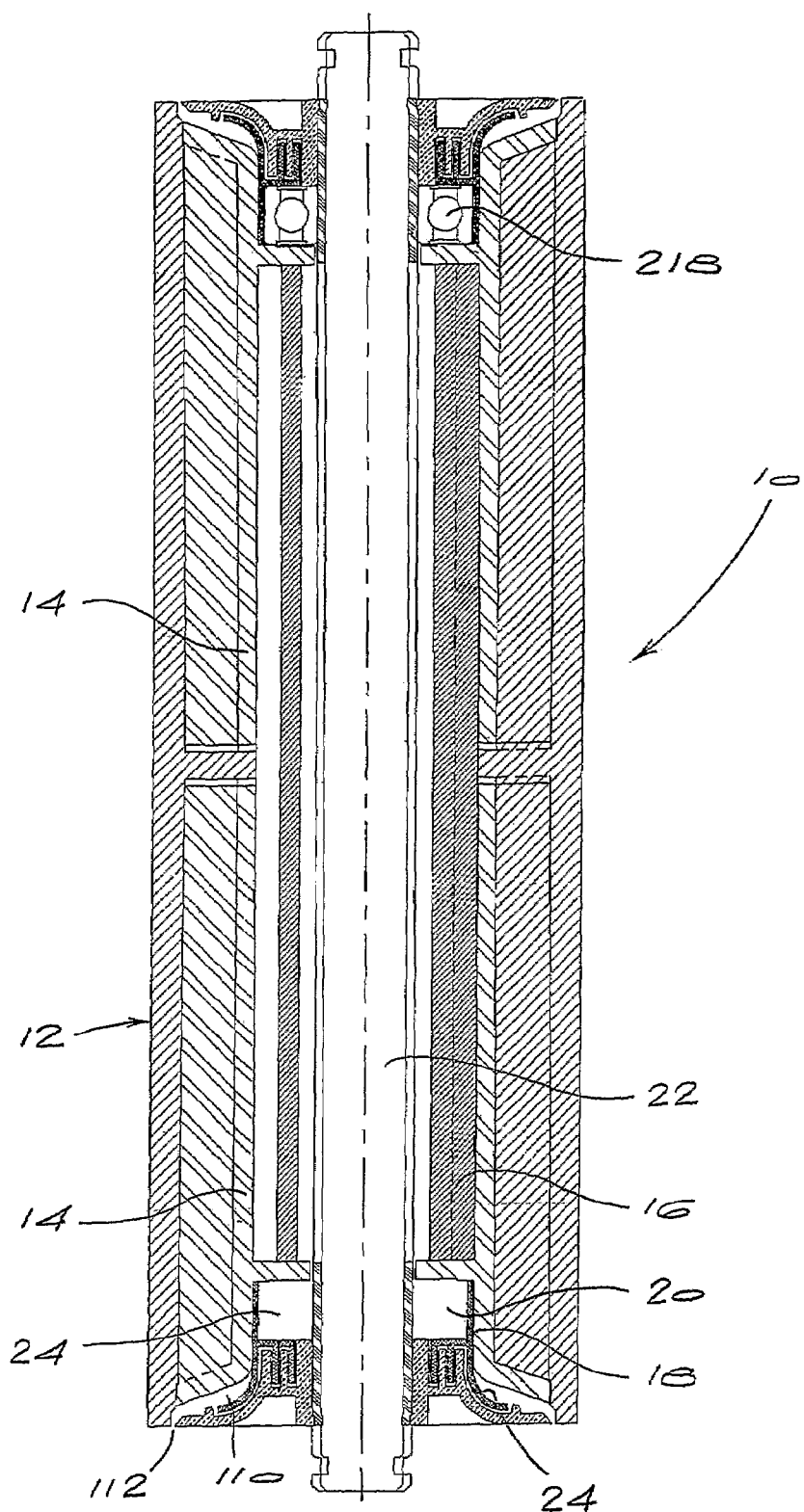
FIG. 1 is a cross-sectional side view of an idler according to the invention.

Referring firstly to FIG. 1, an idler 10 has a shell 12 with two outer cores 14 within the shell 12. An inner core 16 is located within each outer core 14. Each outer core 14 has a bearing receiving zone 18 for a bearing 20 located within a bearing housing 24. A shaft 22 is supported within the bearings 20.

Figure 2:
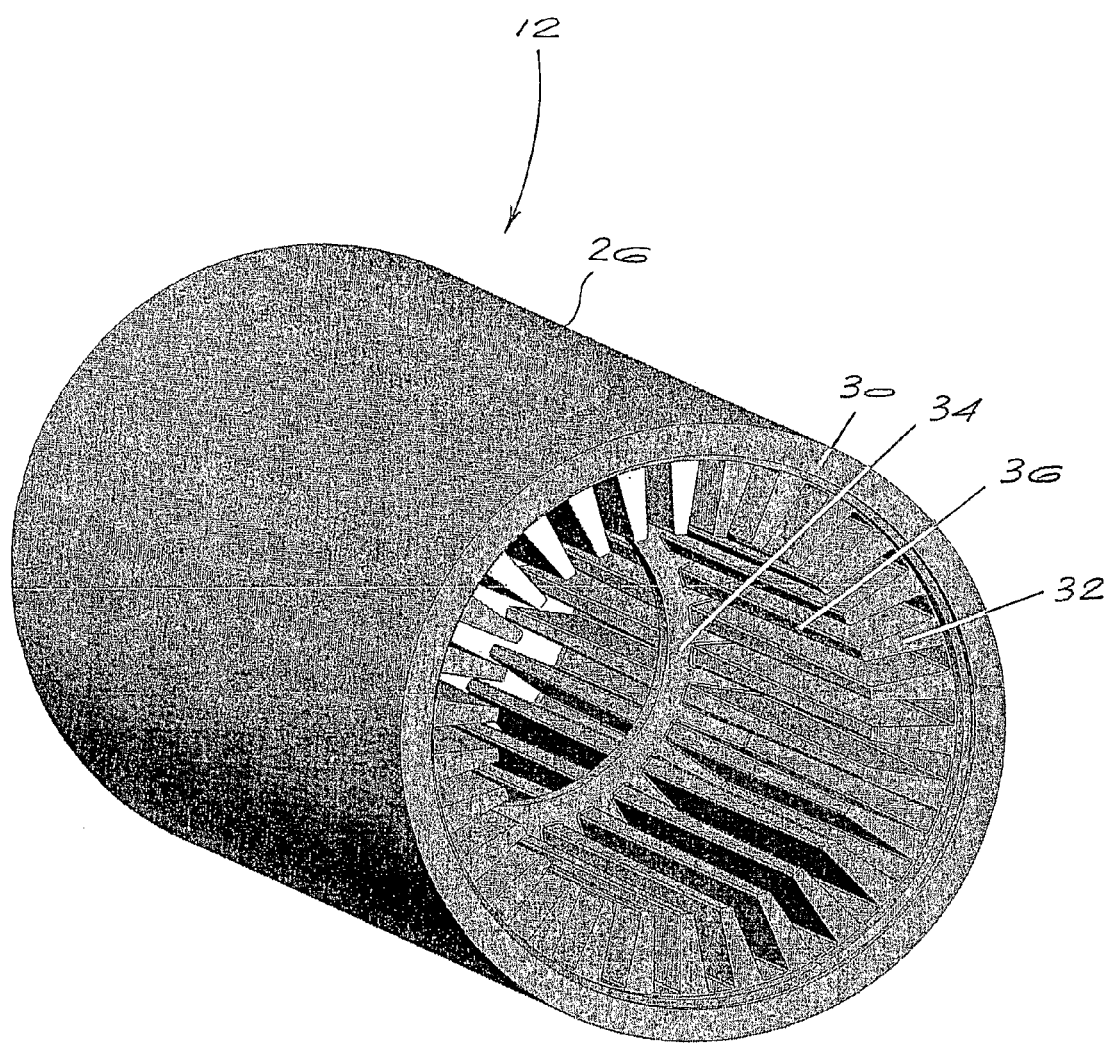
FIG. 2 is a perspective view of the shell of the idler.
Figure 3:
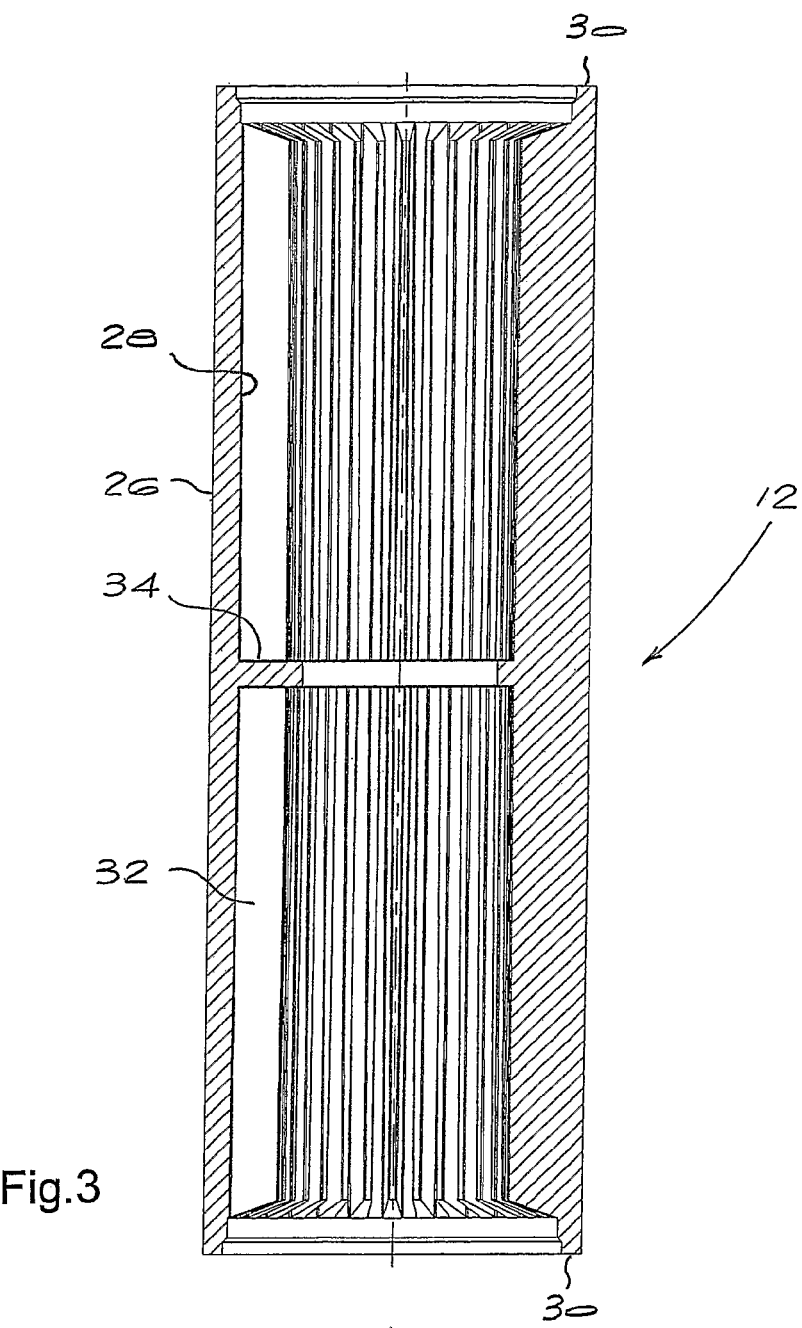
FIG. 3 is a cross-sectional side view of the shell.
Figure 4:
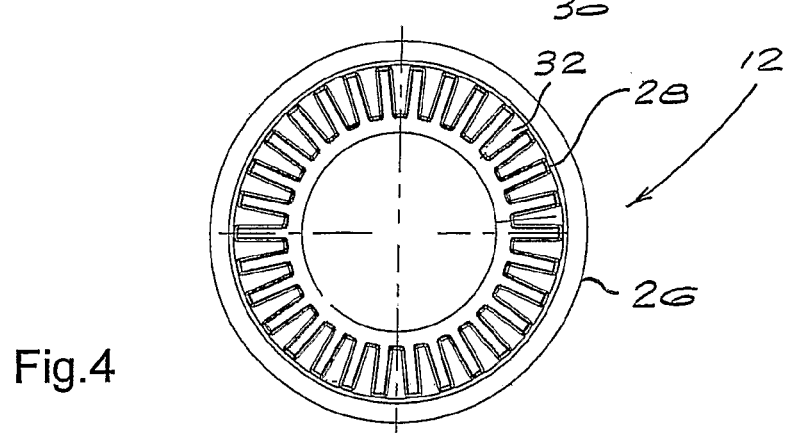
FIG. 4 is an end view of the shell.

Referring now to FIGS. 2 to 4, the shell 12, which is injection moulded from high density polyethylene, has an outer surface 26, over which a conveyor belt (not shown) can run, an inner surface 28, and opposite ends 30. Ribs 32 radiate inwardly from the inner surface 28. Each rib 32 tapers outwardly along its length from its respective end 30 of the shell to a central ring 34. In addition each rib 32 tapers inwardly from the inner surface 28 of the shell 12 to a tip 36.

Figure 5:
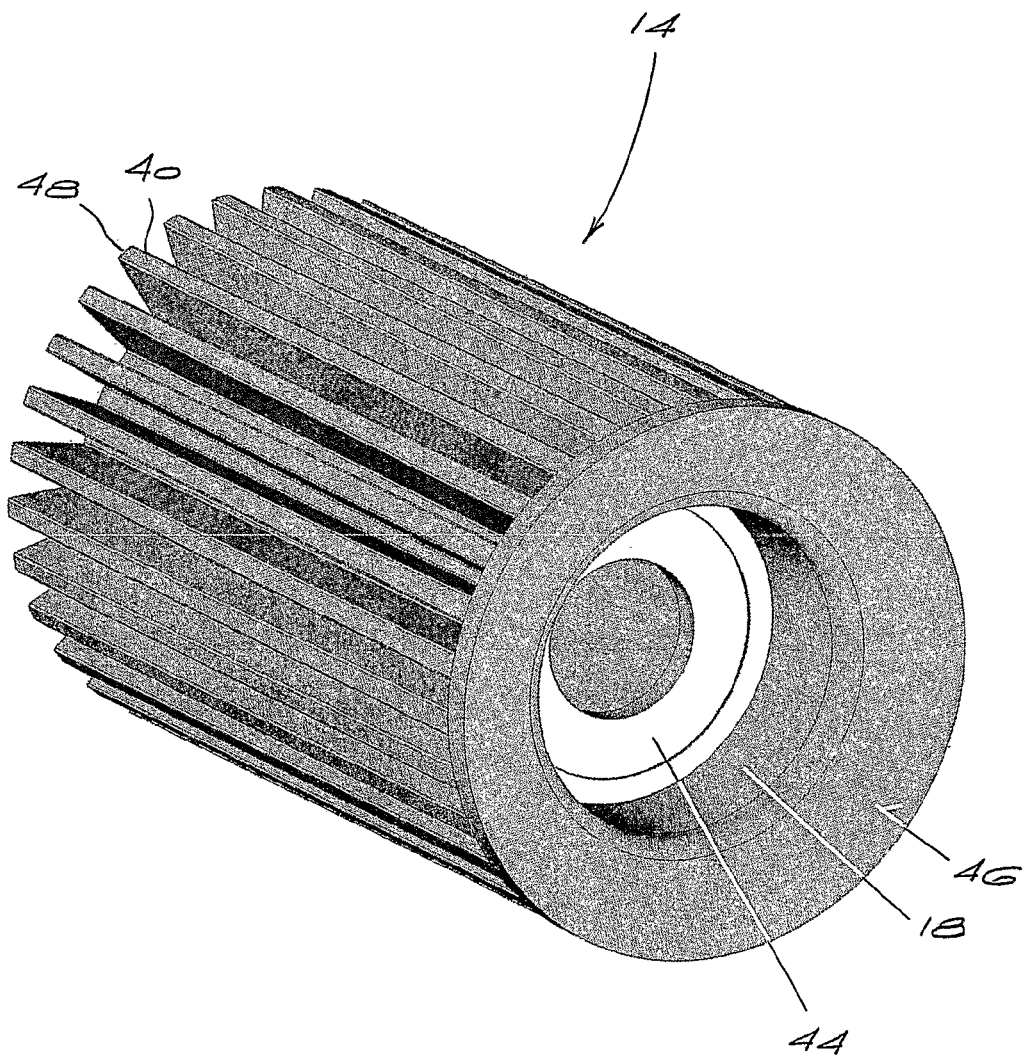
FIG. 5 is a perspective view of an outer core of the idler.
Figure 6:
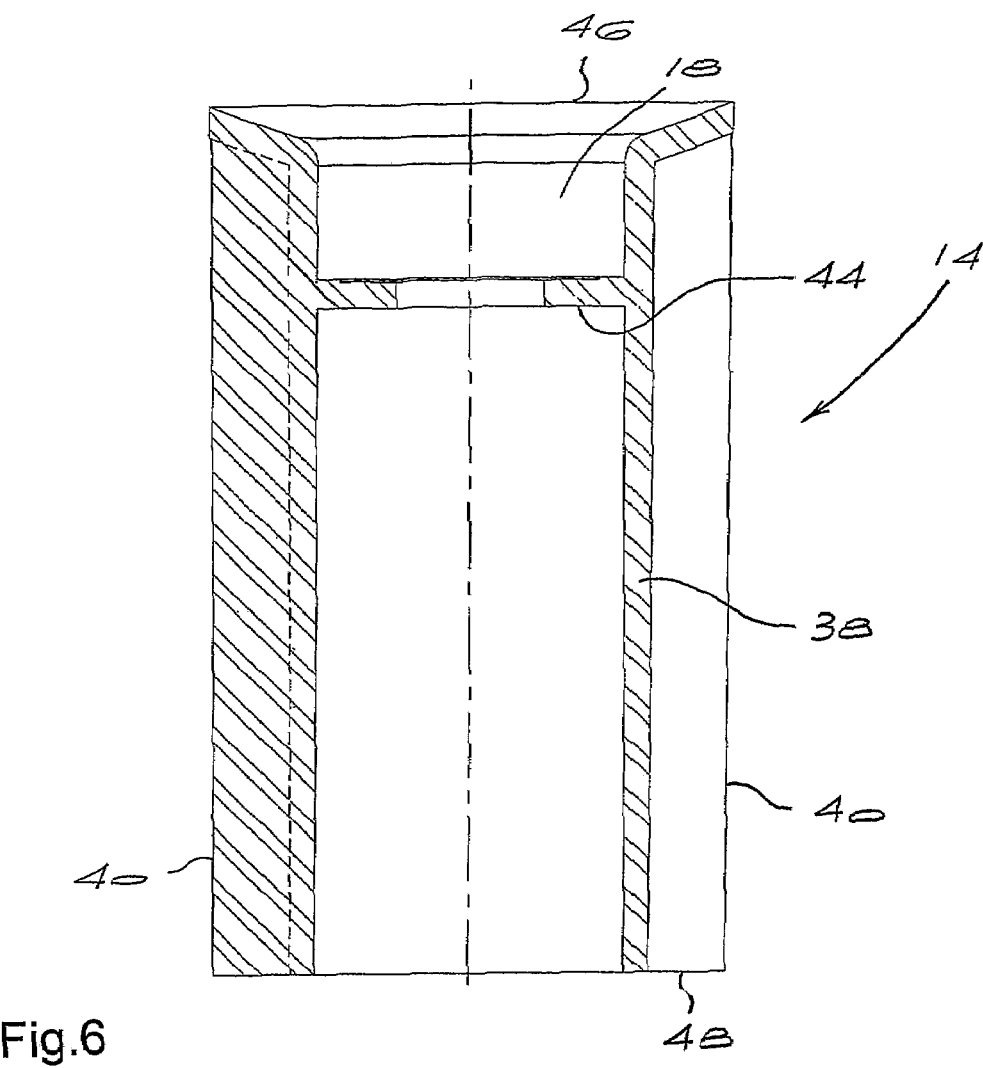
FIG. 6 is a cross-sectional side view of the outer core.
Figure 7:
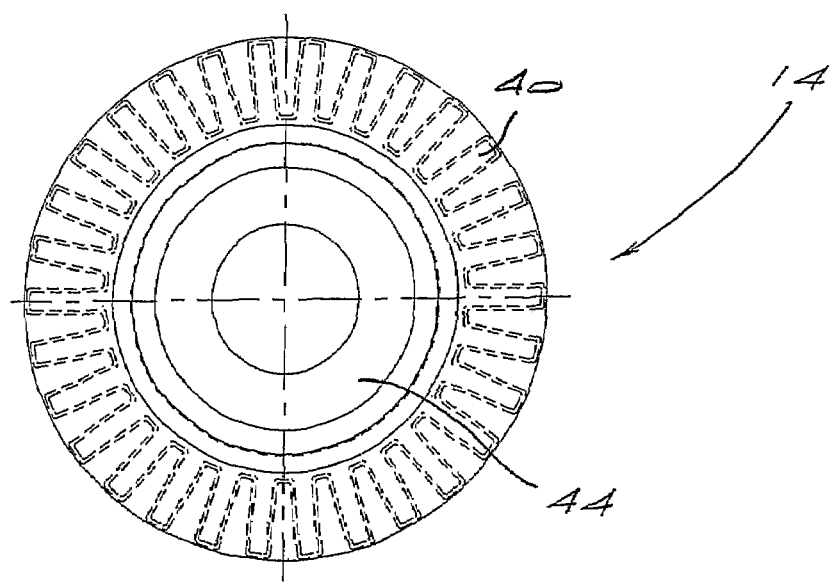
FIG. 7 is an end view of the outer core.

Referring now to FIGS. 5 to 7, each outer core 14 consists of a tubular section 38 with ribs 40 radiating outwardly therefrom. The bearing receiving zone 18 is located between an inwardly extending ring 44 and an outer end 46 of the outer core 14. The ribs 40 taper inwardly along their length from the outer end 46 to an inner end 48 of the outer core 14. The ribs 40 have substantially parallel sides and thus do not taper from root to tip in the same fashion as the ribs 32 of the shell 12. As with the shell 12, each outer core 14 is injection moulded from high density polyethylene. Ribs radiating inwardly from the tubular section between the ring 44 and the inner end 48 are not shown as the inner core 16 may be omitted as described in more detail below.

Figure 8:
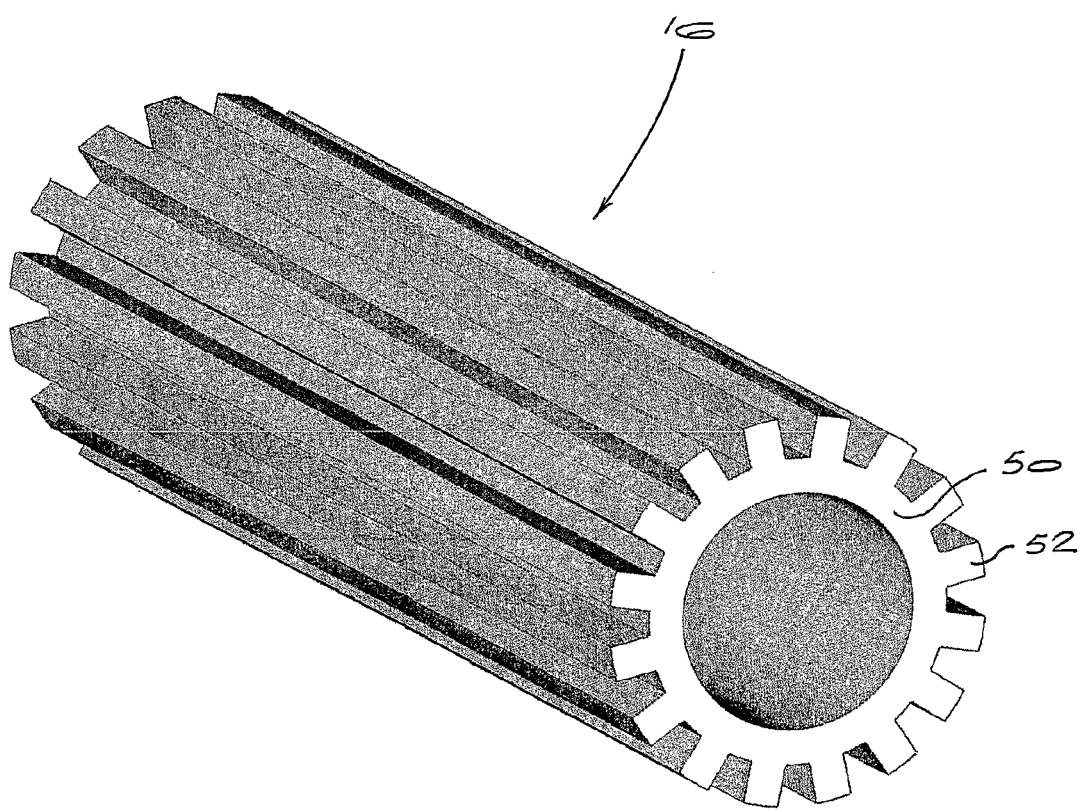
FIG. 8 is a perspective view of an inner core of the idler.
Figure 9:
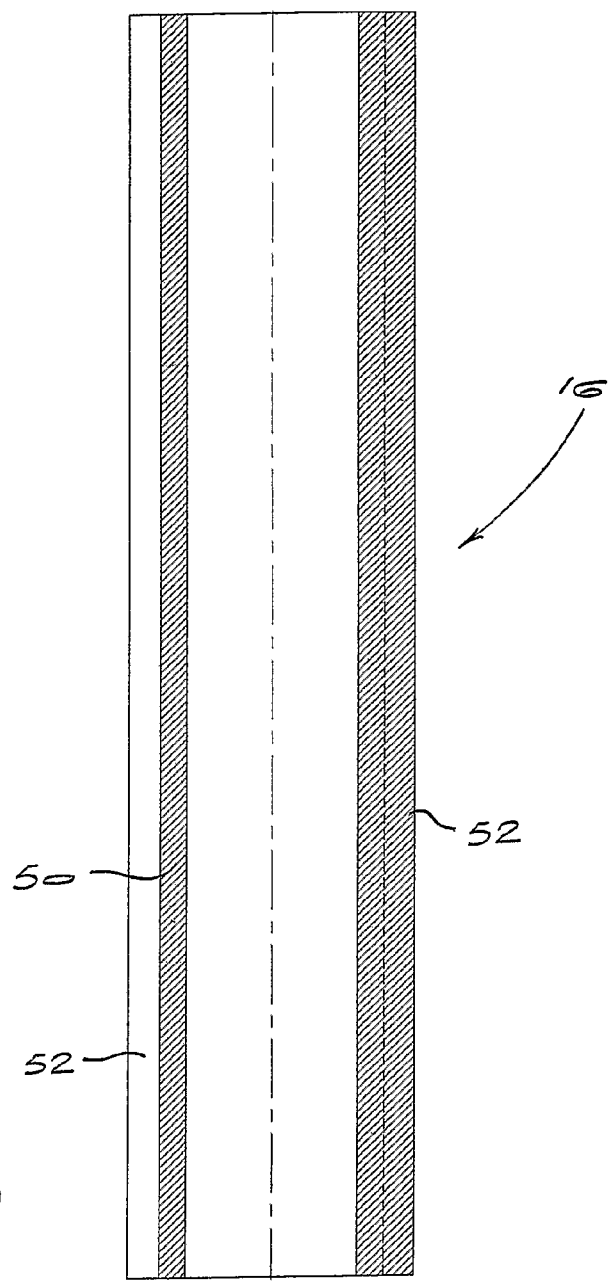
FIG. 9 is a cross-sectional side view of the inner core.
Figure 10:
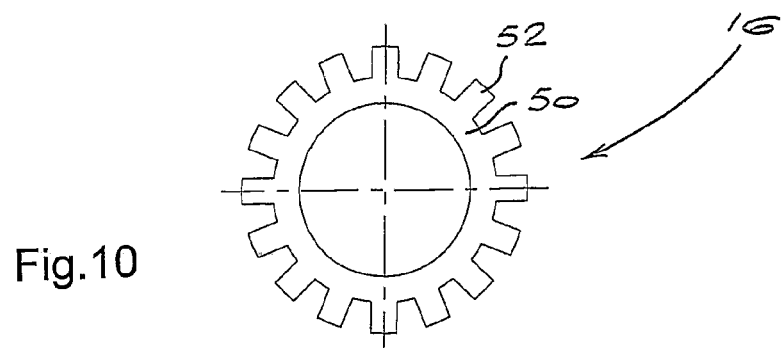
FIG. 10 is an end view of the inner core.
Figure 11:
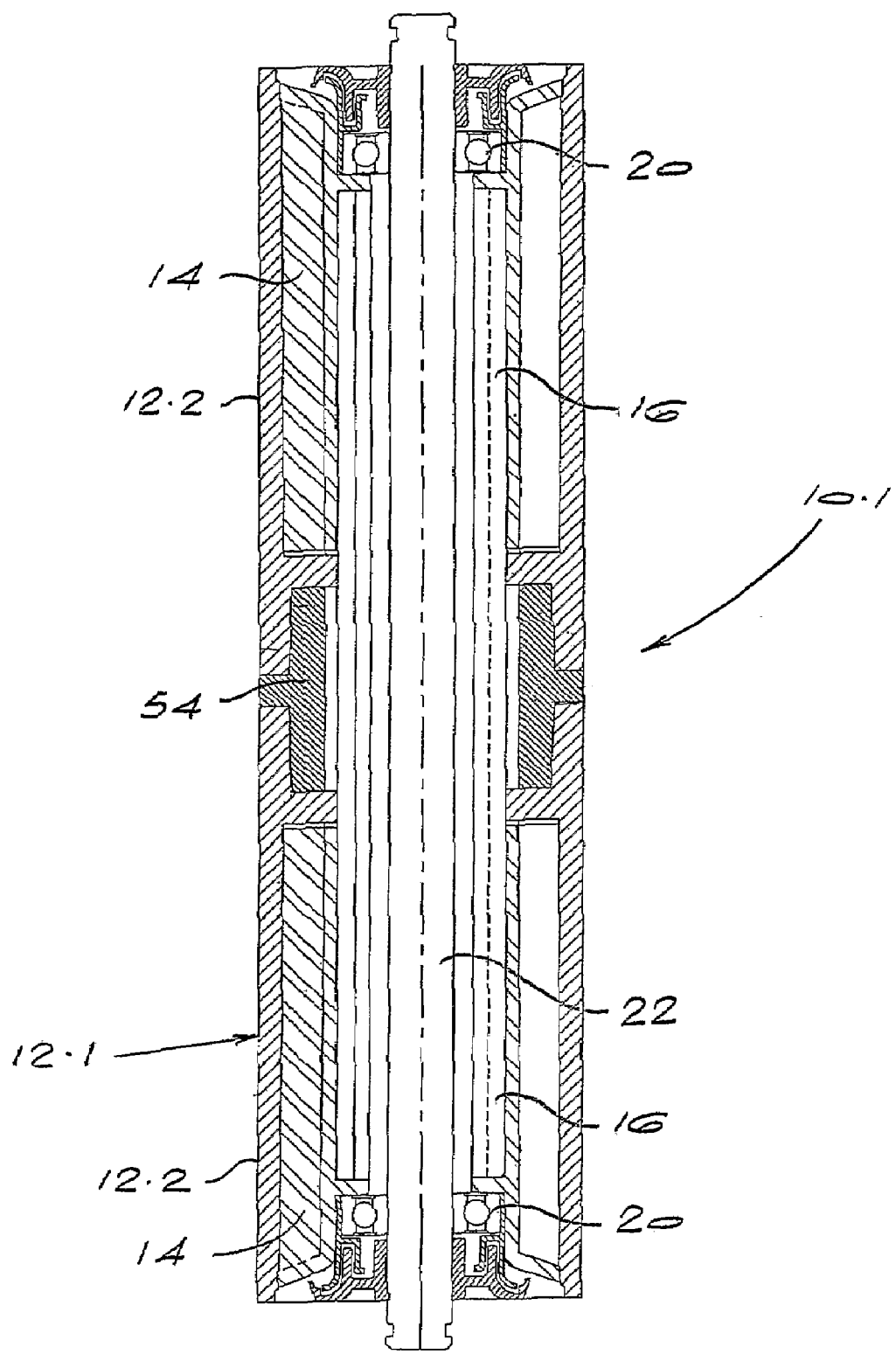
FIG. 11 is a cross-sectional side view of an idler according to another embodiment of the invention.
Figure 12:
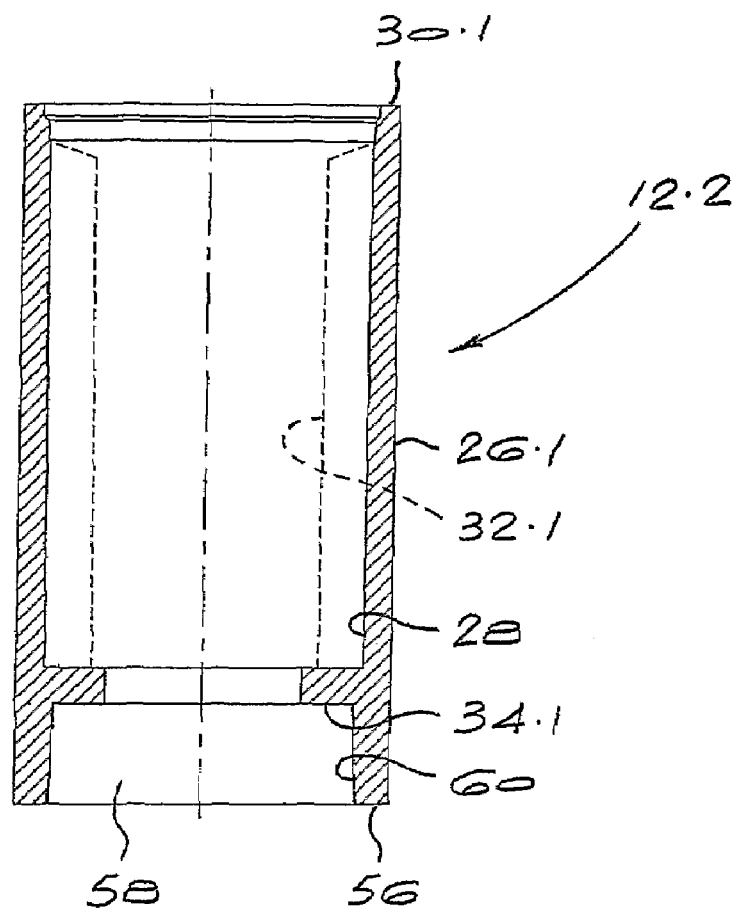
FIG. 12 is a cross-sectional side view of a shell section for the idler of FIG. 11.
Figure 13:
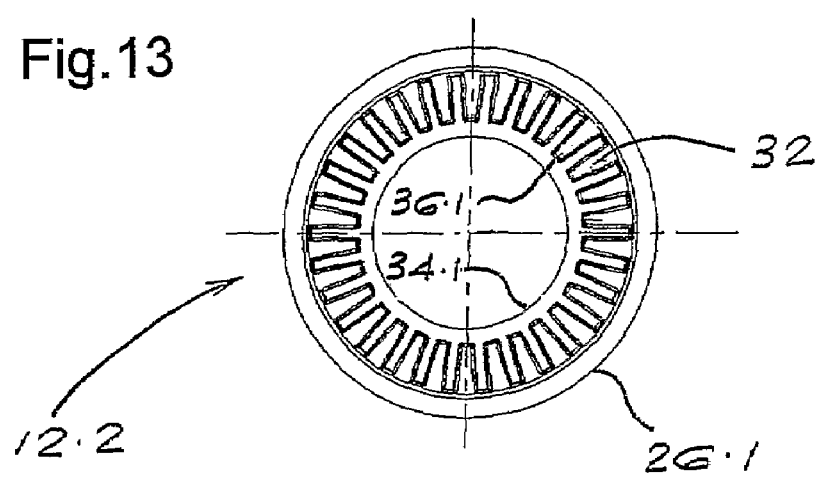
FIG. 13 is an end view of the shell section of FIG. 12.
Figure 14:
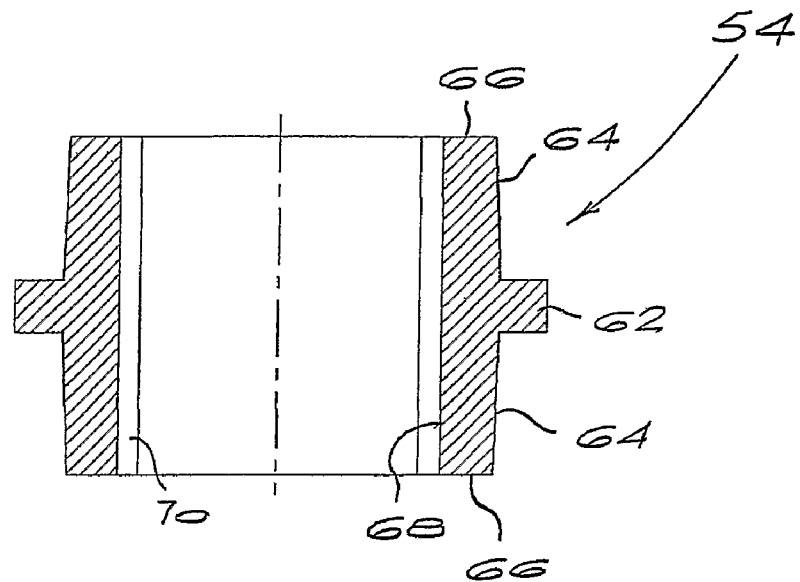
FIG. 14 is a cross-sectional side view of a connector for the idler of FIG. 11.
Figure 15:
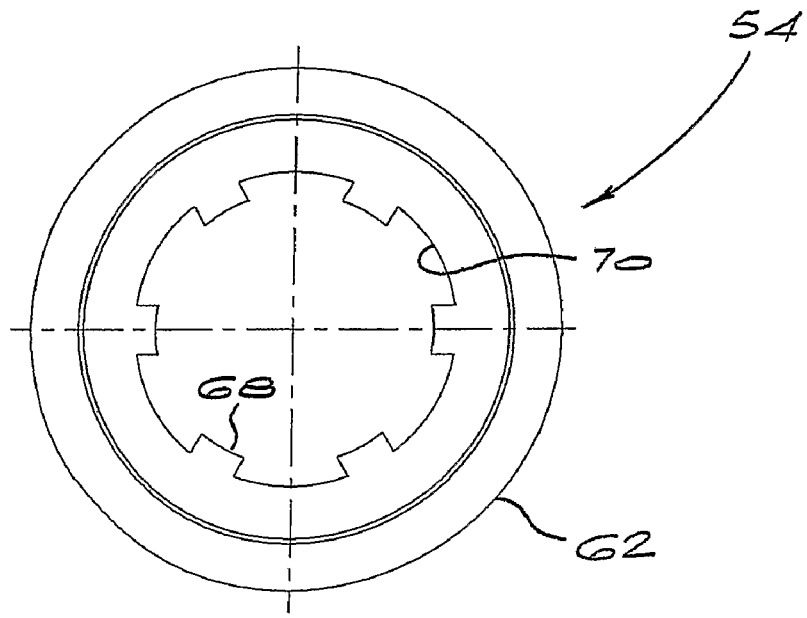
FIG. 15 is an end view of the connector of FIG. 13.

Referring now to FIGS. 8 to 10, each inner core 16 consists of a hollow tubular section 50 with ribs 52 radiating outwardly therefrom. Each inner core 16 is injection moulded from high density polyethylene.

The cores 14 and 16 may be made of polypropylene with long fibres, or nylon 66 or fibre filled nylon.

The idler 10 is assembled by pressing the outer cores 14 into opposite ends of the shell 12 with about 20 tons of force, with the ribs 32 and 40 being in meshing or interlocking engagement and forming an interference fit with one another. The effect of this is that the ribs 32 of the shell 12, the ribs 40 of the outer cores 14, the tubular sections 38 of the outer core 14, and the tubular parts of the shell 12, together define two solid circular cylindrical regions of high density polyethylene which strengthen the idler 10.

Should it be necessary further to strengthen the idler 10, the inner cores 16 are pressed into their respective outer cores 14. It will be appreciated that the effect of this will be to increase the thickness of the two solid circular cylindrical regions.

The shaft 22 is then inserted and the bearing housings 20 are pressed into their respective bearing receiving zones 18.

The idler 10 has the advantage that it is relatively light weight, typically 40% lighter than a steel idler of similar dimensions. In addition, the solid circular cylindrical sections of high density polyethylene provide strength and material which can be worn away by a conveyor belt (not shown) without damage being caused to the belt, which could be the case if the shell was made of steel. A further advantage of the idler 10 is that recycled plastic can be used to mould some or all of the plastic components of the idler 10. This is advantageous from an environmental point of view. A yet further advantage of the idler 10 is that the shell 12, outer cores 14 and inner cores 16 can be injection moulded with low cycle times because of their configuration. The ribs facilitate cooling. Furthermore, the configuration of these components provides for the correct orientation of the plastic molecules which results in greater strength of these components. Because the shell and cores are injection moulded, this enables a high degree of accuracy, concentricity and straightness to be achieved.

It is pointed out that the idler need not be assembled by pressing the cores into the shell but could also for example be assembled by inserting the cores into the shell when the shell is still hot. As the shell contracts while cooling it will form an interference fit with the cores.

Referring now to FIGS. 11 to 14, an idler 10.1 has a shell 12.1. The shell 12.1 consists of two shell sections 12.2 connected together by a connector 54. An outer core 14 is located within each shell section 12.2. An inner core 16 is located within each outer core 14.

Each shell section 12.2 is injection moulded from high density polyethylene, and has an outer surface 26.1, an inner surface 28.1, an outer end 30.1 and an inner end 56. Axially extending ribs 32.1 radiate inwardly from the inner surface 28.1. Each rib 32.1 tapers outwardly along its length from the end 30.1 of the shell section 12.2 to a ring 34.1. In addition, each rib 32.1 tapers inwardly from the inner surface 28.1 of the shell section 12.2 to its tip 36.1.

A socket 58 for part of the connector 54 is provided between the ring 34.1 and the inner end 56 of the shell section 12.2. The socket 58 has a bore 60 which tapers inwardly from the inner end 56 to the ring 34.1.

The connector 54 has a central projecting ring 62 and two spigots 64. The outer surface of each socket 64 tapers inwardly along its length from the ring 62 to its free end 66. The connector 54 has an inner surface 68 with spaced inwardly projecting ribs 70. The connector 54 is injection moulded from high density polyethylene. The connector 54 is friction welded to the shell sections 12.2 to form the shell 12.1. This is achieved by friction welding one of the shell sections to the connector 54, and thereafter friction welding the other shell section to the connector 54. Use of the connector 54 and the two shell sections 12.1 and 12.2 enables a long idler to be produced without the high tooling and machine costs associated with producing a single shell having the length of the two shell sections.

Figure 16:
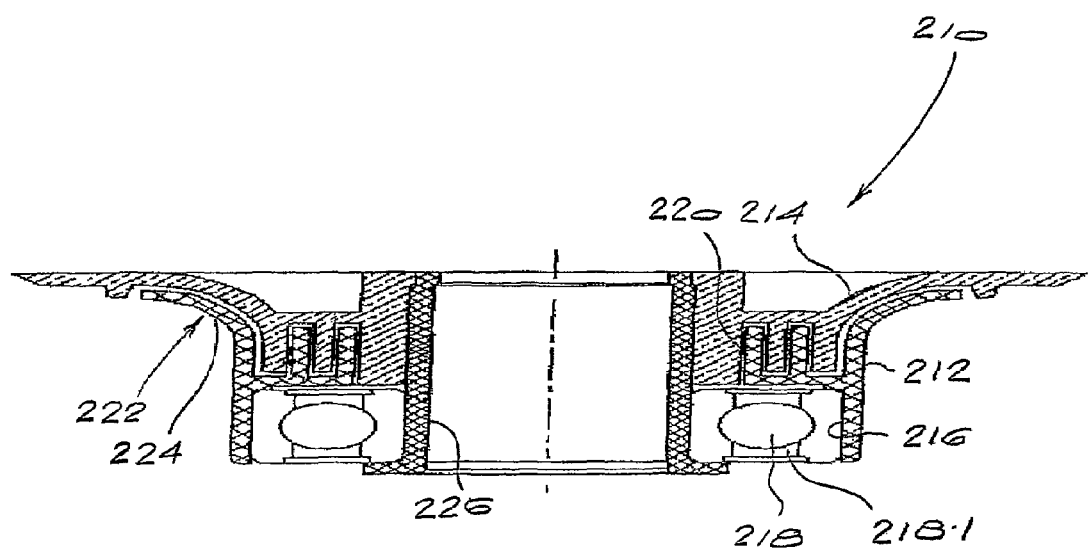
FIG. 16 is a cross-sectional side view of a sealing arrangement according to the invention.

Referring now to FIG. 16, a sealing arrangement 210 has a body 212 rotatable relative to a shield 214. The body 212 includes a bearing housing 216 for a bearing 218. A labyrinth seal 220 is formed between the body 212 and the shield 214. A centrifugal seal 222 is formed by a curved surface 224 on the body 212. The body 212 is connected to the shield 214 by a connector 226.

Figure 17:
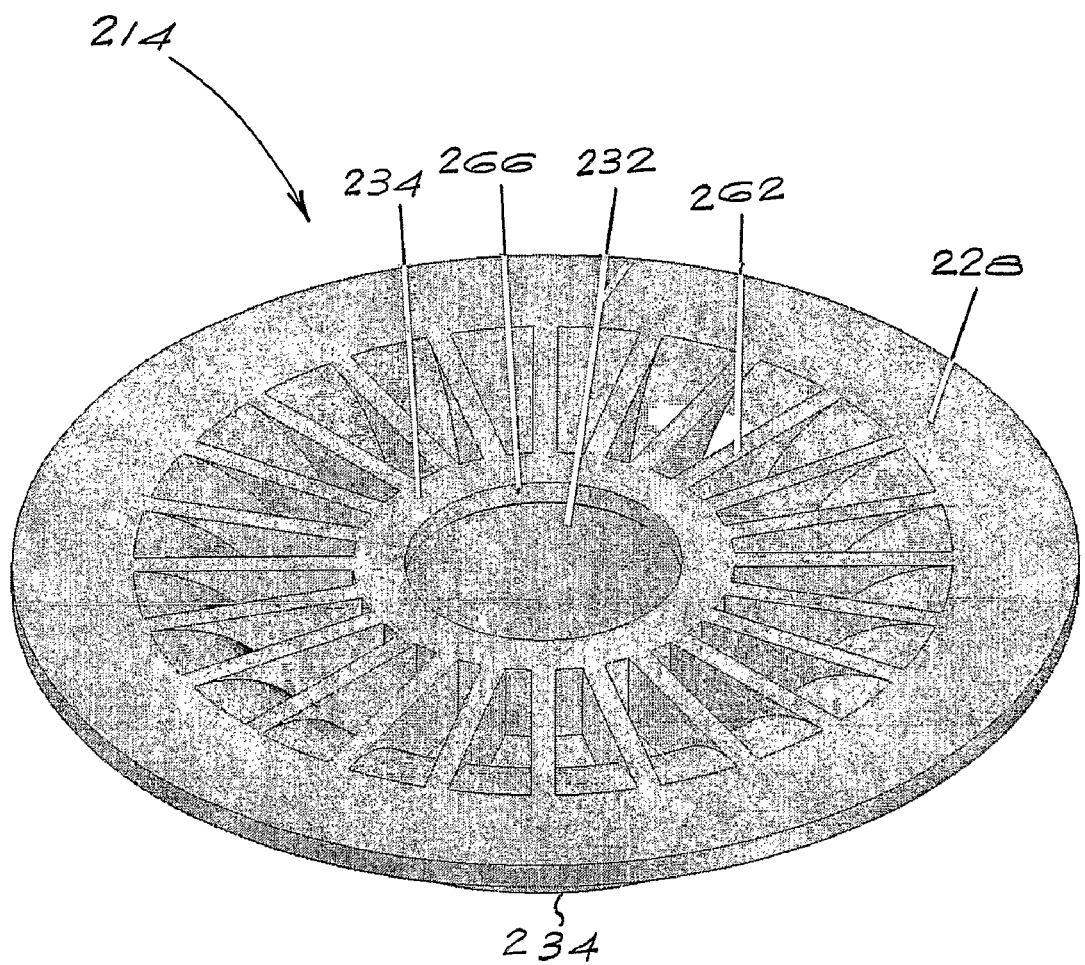
FIG. 17 is a perspective view of the shield of the sealing arrangement.
Figure 18:
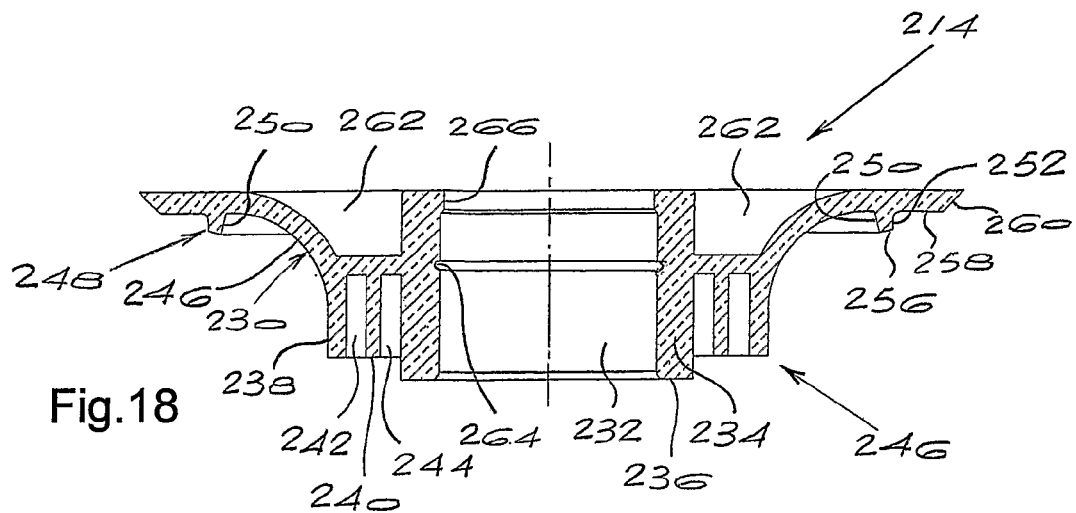
FIG. 18 is a cross-sectional side view of the shield.
Figure 19:
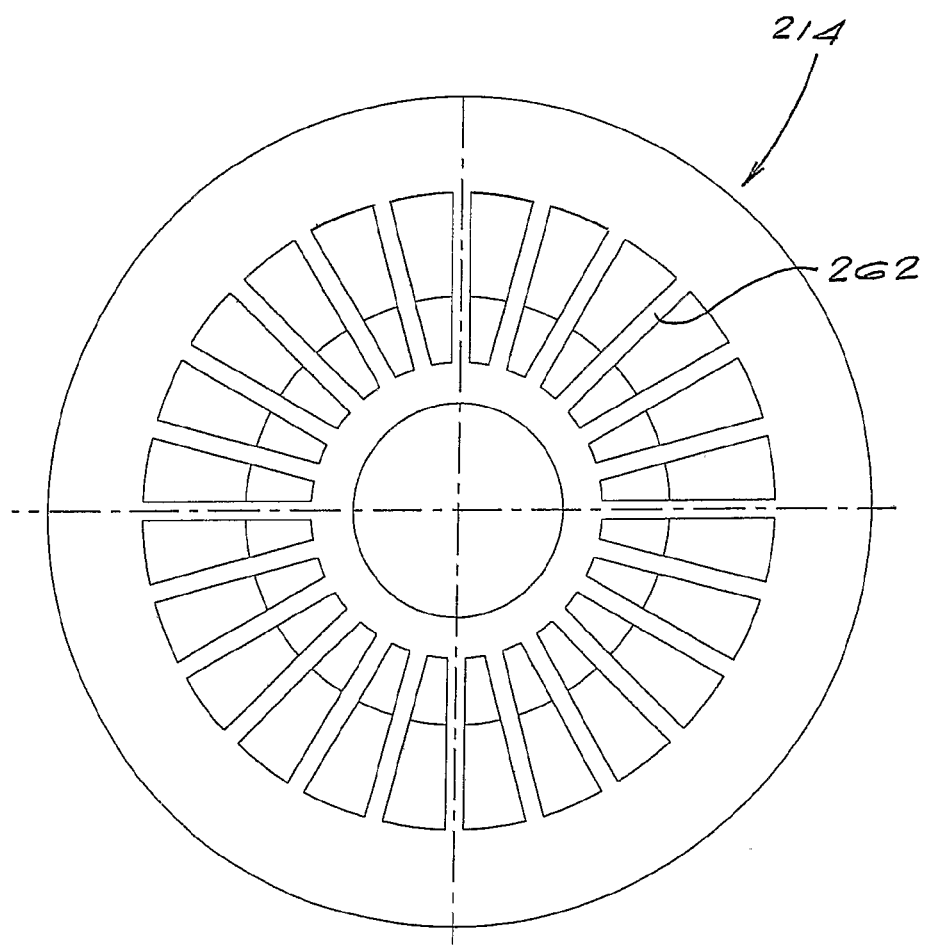
FIG. 19 is an end view of the shield.

Referring now to FIGS. 17 to 19, the shield 214 has an outer surface 228, inner surface 230, a bore 232 within a tubular section 234. The tubular section 234 has an abutting end 236 for abutting the stationary inner race 218.1 of the bearing 218. The shield 214 also has two annular rings 238 and 240, and two annular recesses 242 and 244, which together define a first part 246 of the labyrinth seal 220. A concave surface 246 is provided on the inner surface 230 of the shield 214. The concave surface 246 terminates at an annular lip 248. The annular lip 248 has an inner inclined surface 250, an outer inclined surface 252 and inclined free end 256. Beyond the lip 248 the shield has a radially outwardly extending section 258 which terminates in an inclined free end 260.

The outer surface of the shield 214 has strengthening ribs 262. The bore 232 of the shield 214 contains a sunken ring 264 for locking engagement with the connector 226. The bore 232 also contains a raised ring 266 for location within a sunken ring 268 of a shaft 270 (see FIG. 1). The shield 214 is injection moulded from high density polyethylene.

Figure 20:
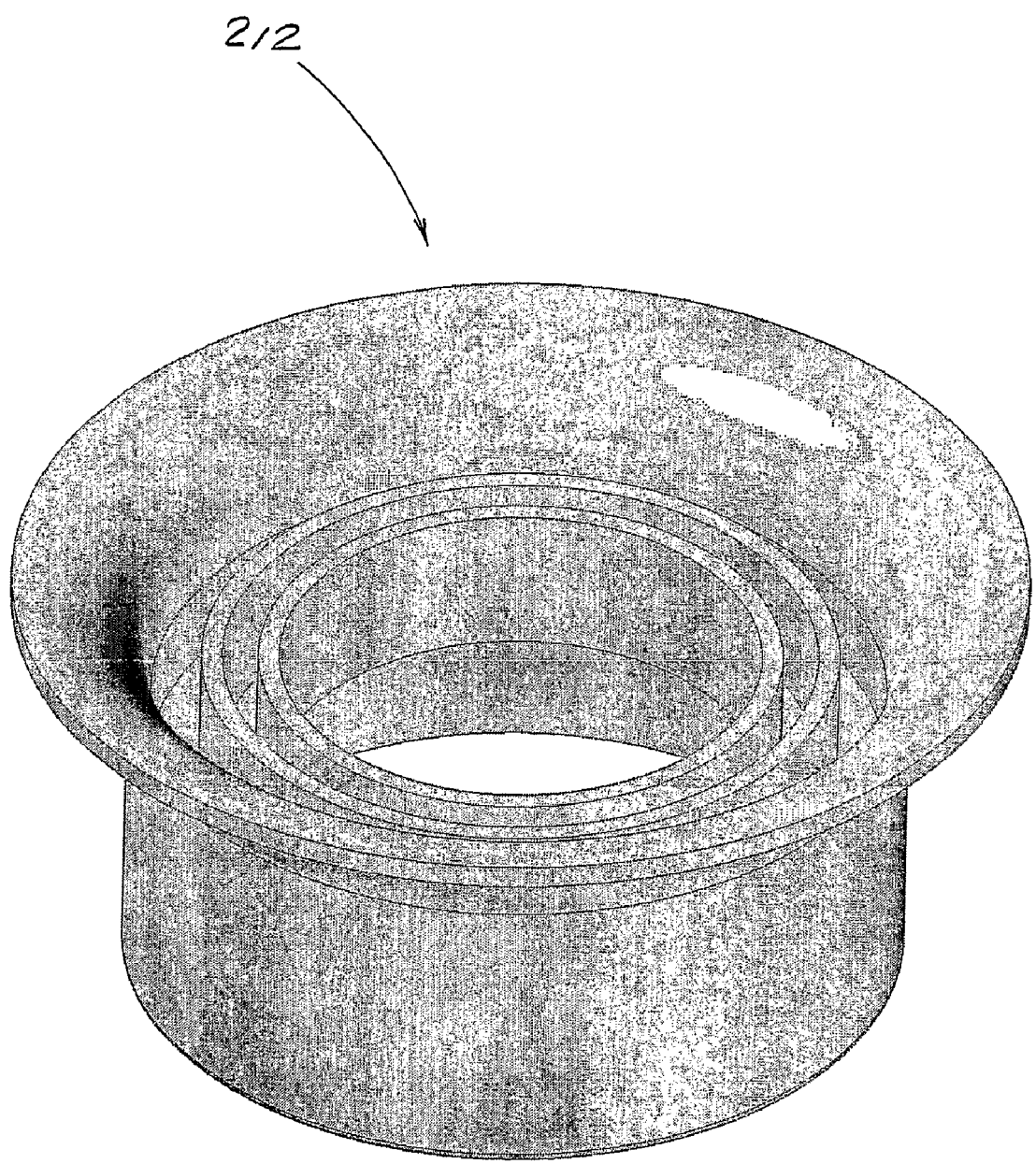
FIG. 20 is a perspective view of the body of the sealing arrangement.
Figure 21:
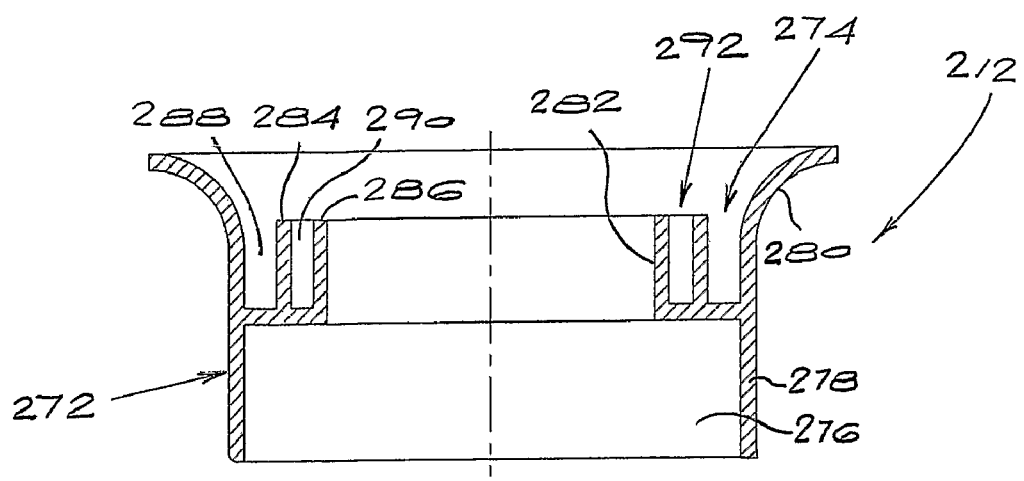
FIG. 21 is a cross-sectional side view of the body.
Figure 22:
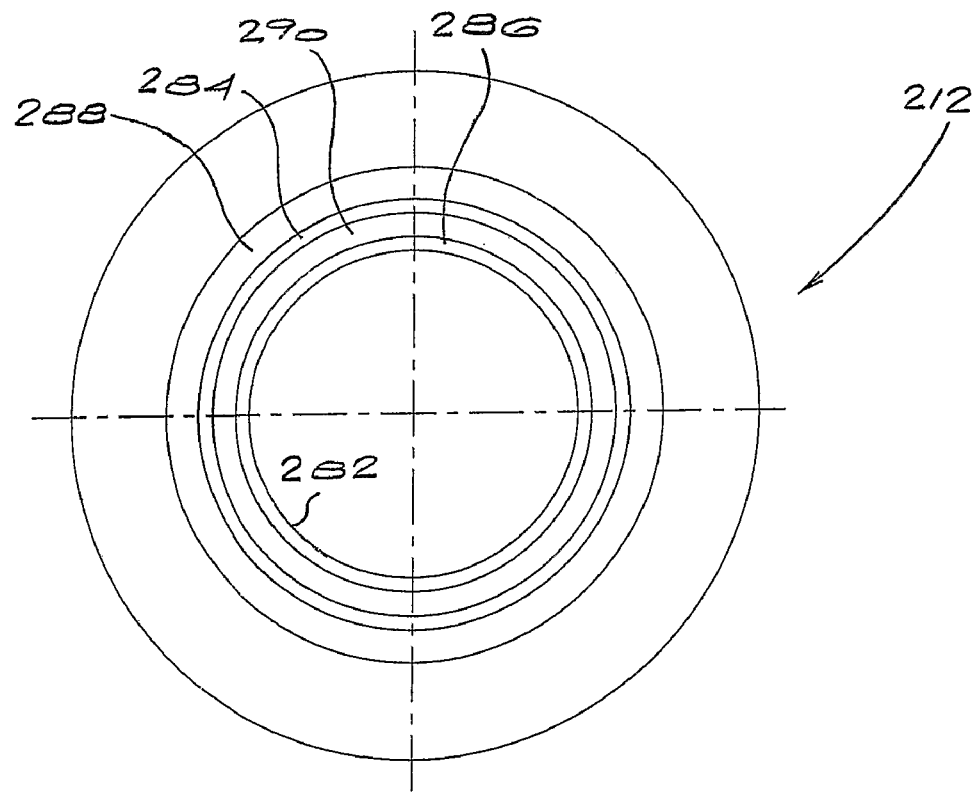
FIG. 22 is an end view of the body.

Referring now to FIGS. 20 to 22, the body 212 has an outer surface 272 and an inner surface 274. A bearing housing 276 is formed by a circular cylindrical section 278.

A concave surface 280 is provided at the opposite end of the body 212 to the bearing housing 276.

A bore 282 is provided in the body 212. Two annular rings 284 and 286, and two annular recesses 288 and 290 together define a second part 292 of the labyrinth seal.

Figures 23, 24:
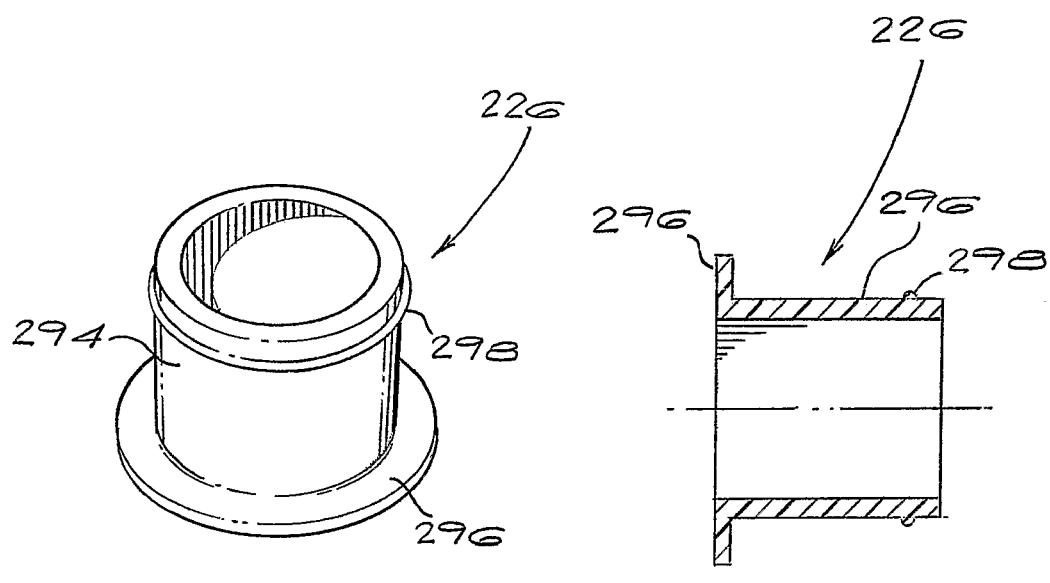
FIG. 23 is a perspective view of the connector of the sealing arrangement.
FIG. 24 is a cross-sectional side view of the connector.

Referring now to FIGS. 23 and 24, the connector 226 consists of a hollow spigot 294 with a flange 296 at one of the ends thereof. A raised ring 298 is located towards the other of the ends of the spigot 294.

The body 212 is axially spaced from the shield 214 because the abutting surface 236 of the shield 14 abuts the inner race of the bearing 218 (see FIG. 16). The connector 226 is pressed onto the shaft and the raised ring 298 of the connector 226 locates within the sunken ring 264 of the shield 214. The shield 214 is thus locked to the body 212, and the sealing arrangement 210 is a modular unit.

Referring again to FIG. 1, when the shell 12 is rotated by a conveyor belt (not shown) passing over it, the body 212 rotates with the shell 12. Any foreign particles entering a gap 110 via an opening 112 between the shield 214 and the shell 12 rotate with the concave surface 280 of the body 212, and should be flung back out of the gap 112. Should any such foreign particle not be flung out of the opening 112, it could only reach the bearing 218 after passing through the labyrinthine pathway of the labyrinth seal 220.

The raised projection 266 on the bore 232 of the shield 214 locates within a groove in the shaft 22. If the idler 10 is dropped end first onto the shaft 22, which is likely to damage the bearings, the raised ring 266 will shear and provide an indication that the idler 10 has been dropped in such a fashion and that the bearings 218 are likely to have been damaged.

Although specific mention has been made that the shell and the cores are produced from high density polyethylene it will be appreciated that a range of materials could be employed. These materials include various polymeric materials, typically nylon, as well as carbon fibre.

It will be appreciated that many modifications or variations of the invention are possible without departing from the spirit or scope of the invention. For example in relatively light duty application the outer core or cores may be of reduced length. Thus they may only extend up to the inwardly extending ring 44 to provide sufficient length to receive the bearing housing only.

The invention claimed is:

1. An idler having a shell with at least one core within the shell, the shell having a plurality of spaced apart inwardly projecting shell formations spread about the entire periphery of the shell, and the core having a plurality of spaced apart outwardly projecting core formations spread about substantially the entire periphery of the core, with the shell formations and the outwardly projecting core formations being engaged with one another.

2. The idler of claim 1 wherein the shell formations are in interlocking engagement with the core formations.

3. The idler of claim 1 wherein the shell formations project radially inwardly, and the outwardly projecting core formations project radially outwardly.

4. The idler of claim 2 wherein the shell formations and the outwardly projecting core formations are in interlocking engagement with one another by way of an interference fit.

5. The idler of claim 1 wherein the shell formations taper outwardly along their length from an outer end of the shell and inwardly along their height towards their free ends, and wherein the outwardly projecting core formations taper inwardly along their length from an outer end.

6. The idler of claim 1 wherein the shell formations are ribs and the outwardly projecting core formations are ribs.

7. The idler of claim 1 wherein the shell is moulded from a polymeric material and wherein the core is moulded from a polymeric material.

8. The idler of claim 1 wherein the core includes a bearing receiving zone containing a bearing rotatably supporting the idler on a shaft.

9. The idler of claim 1 wherein the core is an outer core containing at least one inner core, the inner core having at least one outwardly projecting inner core formation, and the outer core having at least one inwardly projecting outer core formation, with the outwardly projecting inner core formation and the inwardly projecting outer core formation being in engagement with one another.

10. The idler of claim 9 including two cores within the shell, each core extending into the shell from an opposite end of the shell.

11. The idler of claim 10, wherein each outer core contains an inner core.

12. The idler of claim 10 wherein the shell consists of two sections connected together by a connector located intermediate the two cores.

13. The idler of claim 12 wherein the shell sections are connected to the connector by way of friction welding.

14. An idler having a shell with an outer surface and an inner surface, with a plurality of spaced axially extending inwardly projecting ribs spread about substantially the entire periphery of the shell.

15. A shell for an idler, the shell being injection moulded from a polymeric material and having an outer surface and an inner surface, with a plurality of spaced axially extending inwardly projecting ribs spread about substantially the entire periphery of the shell extending from the inner surface.

16. A core for an idler, the core being injection moulded from a polymeric material and having an outer surface with a plurality of spaced axially extending outwardly projecting ribs spread about substantially the entire periphery of the core.

17. The core of claim 16 including a bearing receiving zone at one of its ends.

18. A sealing arrangement including a body rotatable relative to a shield with the body having a housing for a bearing, and the arrangement including a labyrinth seal located between the shield and the body and a centrifugal seal formed by a curved surface on the exterior of the body.

19. A sealing arrangement including a shield and a body, with the shield having a bore for a shaft and a projection with an abutting end surface for abutting a stationary surface axially to space the shield from the body and a connector for connecting the shield to the body so that in use the body can rotate relative to the shield, with the sealing arrangement including a labyrinth seal and a centrifugal seal.

* * * * *